July 15, 1930.    M. KOEHLER    1,770,474
DISTRIBUTION CONDUIT FOR LUBRICATION SYSTEMS Original Filed Jan. 7, 1927

Inventor
Marcel Koehler
by Henry Orth
Atty

Patented July 15, 1930

1,770,474

UNITED STATES PATENT OFFICE

MARCEL KOEHLER, OF PARIS, FRANCE, ASSIGNOR TO SOCIÉTÉ ANONYME: GRAISSAGE "ALCYL," OF LEVALLOIS PERRET, SEINE, FRANCE, A COMPANY OF FRANCE

DISTRIBUTION CONDUIT FOR LUBRICATION SYSTEMS

Original application filed January 7, 1927, Serial No. 159,702, and in Belgium April 22, 1926. Divided and this application filed September 26, 1928. Serial No. 308,555.

My invention relates to improvements in lubricating systems and more particularly to lubricating systems of the type described and claimed in my Patent 1,665,964, dated April 10, 1928, and in the co-pending application Serial No. 159,702, filed January 7, 1927, of which the present application is a division.

In the drawing—

In the co-pending application above mentioned I disclosed a system in which lubrication took place through a closed circuit by absorption utilizing flexible conduits. The object of this divisional application is to provide a specific form tubing suitable for use with our said system.

According to the invention the capillary element is contained in the said conduits which protect it from external action, and such conduits may have the form of braided cotton tubes which are suitably varnished.

A simpler construction consists in applying, on the capillary element, an adhesive protecting coating of varnish which will not enter such elements when applied.

I preferably obtain this result by employing a varnish consisting of acetate of cellulose dissolved in acetone, which drys at once under proper conditions, and the capillary element will thus be formed in one piece with the covering thereof, which offers certain desirable advantages of construction.

To afford greater strength against wear due to friction upon the surface of the tubes, as well as a greater resistance to flexion, the tubes may consist of successive layers of cotton or metal braid covered at the exterior with one or more coats of varnish. For one of the coats of varnish I may substitute a metallic coating in order to increase the strength of the conduits which is particularly desirable when the conduits are subject to shocks, flexion or analogous effects.

The said tubes may be coated on the interior with one or more coats of varnish which are applied successively, for example, by insufflation of the varnish under pressure, followed by a current of hot air by which the varnish will be hardened, thus eliminating all heating of the tubes in furnaces or drying rooms. Thus by insufflation of the varnish under pressure and supplying air, the varnish will be forced into the interstices which might be produced during manufacture of the tubes and subsequently cause leakage.

The external metallic coating may consist of a sheathing which is formed of a tubular metallic braiding, which consists, for example, of bands formed of parallel wires, said bands being interwoven in a manner known in the art, or of a single metallic band which is wound in helical fashion, with a slight play of one millimeter, or of metallic bands which have a suitable cross section and are secured together, such being wound in helical fashion after the manner of flexible tubing well known in the art.

To increase the rigidity of the tubes I may place within or at one side of the capillary element thereof, one or more metallic wires, for example, of steel, to prevent local deformation of an excessive magnitude which would damage the sheath.

Figure 1:
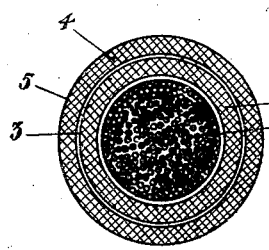
Fig. 1 is a transverse section through a flexible conduit forming the subject matter of our present invention.

Adverting to the drawing, the tube shown in Fig. 1 consists of a capillary element 1 which is surrounded by a flexible sheath or tube 2 consisting of braided fibres coated with a layer of varnish 3. The said sheath is preferably surrounded by a second sheath or tube 4—5 consisting respectively of the same elements. Such a braided construction provides conduits which are considerably flexible and form with the capillary element thereof suitable members which may be bent into any desired shape and thus be adapted to suit the conditions of the system.

Figure 2:
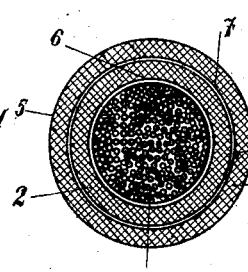
Fig. 2 is a similar view of a modification.
Figure 3:
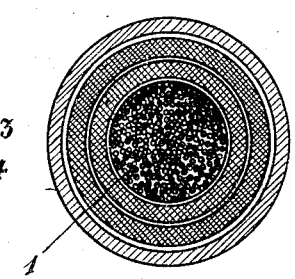
Fig. 3 is a similar view of another modification.

The tube shown in Fig. 2 comprises two sheaths or tubes which are of braided construction and are each given an external coat of varnish 3, 5 and an internal coat 6, 7 whereby the fluid tightness of the conduit is increased.

Figure 4:
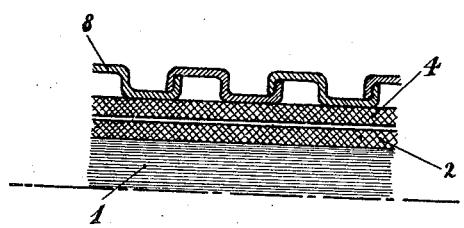
Fig. 4 is a fragmentary longitudinal section through an embodiment of a flexible tube in which metallic sheaths are utilized.
Figure 5:
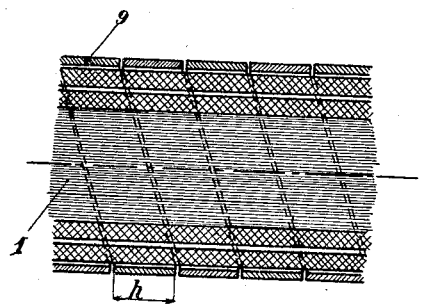
Fig. 5 is a similar view of a modification.
Figure 6:
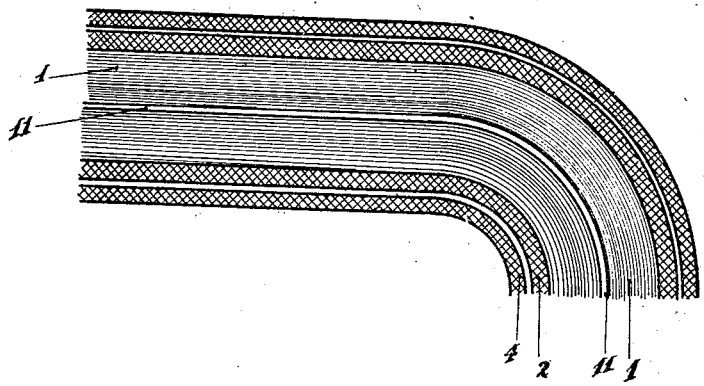
Fig. 6 is a longitudinal section through a flexible conduit in which a metallic core is utilized.

In connection with these tubes, the outer sheath may be further surrounded by a metallic sheath, which may be varied in construction. In the embodiment of Fig. 4 the metallic sheath may consist of bands of suitable cross-section 8 fitting into the neighboring band in a manner well known to those skilled in the art.

In the embodiment of Fig. 17, the outer metallic sheath consists of a band 9 wound in helical fashion and whose edges are disposed in spaced relation, the width $h$ of the band being such that the minimum radius of curvature desired for the tube may be obtained. It will be noted that the radius of curvature will vary inversely as the width $h$ of the said band. The metallic sheath might likewise be composed of a braiding of metallic bands.

To increase the rigidity of the said tubes, which are frequently subject to oscillation and rapid shocks, I may dispose, in the interior of the capillary element and parallel with the axis of the tube, one or more steel wires 11 which act by their rigidity to prevent the tubes from bending as shown in Fig. 18, under conditions which could lead to rupture of the sheath or tube but without detracting from the capillary action thereof.

Having described my invention what I claim as new and desire to secure by Letters Patent is:

1. In a lubricating system of the type described, a distribution conduit comprising, in combination, a capillary element, a flexible sheath braided on said capillary element, a layer of non-penetrating varnish on the said sheath and a flexible metallic protecting sheath surrounding the said varnished sheath.

2. In a lubricating system of the type described, a distribution conduit comprising, in combination, a capillary element, a flexible sheath braided on said capillary element, a layer of non-penetrating varnish consisting of a mixture of cellulose acetate dissolved in acetone on the said sheath and a flexible metallic protecting sheath surrounding the said varnished sheath.

3. In a lubricating system of the type described, a distribution conduit comprising, in combination, a capillary element, a flexible sheath braided on said capillary element, a layer of non-penertating varnish on the said sheath and a protecting sheath consisting of a spirally wound continuous strip of metal surrounding the said varnished sheath.

4. In a lubricating system of the type described, a distribution conduit comprising, in combination, a capillary element, a flexible sheath braided on said capillary element, a layer of non-penetrating varnish on said sheath, a flexible metallic protecting sheath surrounding the said varnished sheath and a deformable stiffening member extending through the said capillary element for allowing said conduit to be bent and retained in various shapes.

5. In a distribution conduit for a lubricating system of the type described, in combination a capillary element, a flexible sheath braided on said capillary element, a layer of varnish on said sheath, and a flexible metallic protecting sheath surrounding said varnished sheath.

6. In a distribution conduit for a lubricating system of the type described, in combination, a capillary element, a flexible sheath braided on said capillary element, a layer of varnish consisting of a mixture of a cellulose derivative dissolved in acetone on the said sheath and a flexible metallic protecting sheath surrounding the said varnished sheath.

7. In a distribution conduit for a lubricating system of the type described, in combination, a capillary element, a flexible sheath braided on said capillary element, a layer of varnish on the said sheath, and a protecting sheath consisting of a spirally wound continuous strip of metal surrounding the said varnished sheath.

8. In a distribution conduit for a lubricating system of the type described, in combination, a capillary element, a flexible sheath braided on said element, a layer of varnish on said sheath, a flexible metallic protecting sheath surrounding the said varnished sheath and a deformable stiffening member extending through the said capillary element for permitting said conduit to be bent and retained in various shapes.

In testimony whereof I have signed this specification.

MARCEL KOEHLER.